United States Patent [19]

Eck

[11] Patent Number: 5,912,970
[45] Date of Patent: Jun. 15, 1999

[54] TELEVISION SCRAMBLING SYSTEM

[75] Inventor: John P. Eck, Kenosha, Wis.

[73] Assignee: Zenith Electronics Corporation, Glenview, Ill.

[21] Appl. No.: 08/629,664

[22] Filed: Apr. 9, 1996

[51] Int. Cl.$^6$ .................................................. H04N 7/167
[52] U.S. Cl. .................................. 380/15; 380/10; 380/17
[58] Field of Search .................................. 380/9, 10, 14, 380/15, 20, 17

[56] References Cited

U.S. PATENT DOCUMENTS

| | | | |
|---|---|---|---|
| 4,706,283 | 11/1987 | Citta et al. | 380/15 X |
| 4,706,284 | 11/1987 | Citta et al. | 380/15 X |
| 4,885,776 | 12/1989 | Citta et al. | 380/15 |
| 4,926,477 | 5/1990 | Paik | 380/15 |
| 5,206,908 | 4/1993 | Kikuchi et al. | 380/15 |

*Primary Examiner*—Bernarr E. Gregory

[57] ABSTRACT

A sync suppression, phase inversion scrambling system for a television signal is modified to improve its anti-piracy attributes SAW filters are switched during horizontal intervals to introduce scrambling The switching is a function of a mode signal and framing code signals of two different widths A false framing code signal is inserted during the vertical interval to switch the filters. Additional false framing code signals of sufficient width to embrace the vertical broad pulses in the television signal are supplied to impart amplitude changes to the vertical broad pulses Authorized decoders can recognize the false framing code signals as legitimate and follow the filter switching performed at the encoder (to restore the vertical broad pulses), whereas pirate decoders cannot The result is a total loss of vertical sync in television receivers connected to the pirate decoders

3 Claims, 3 Drawing Sheets

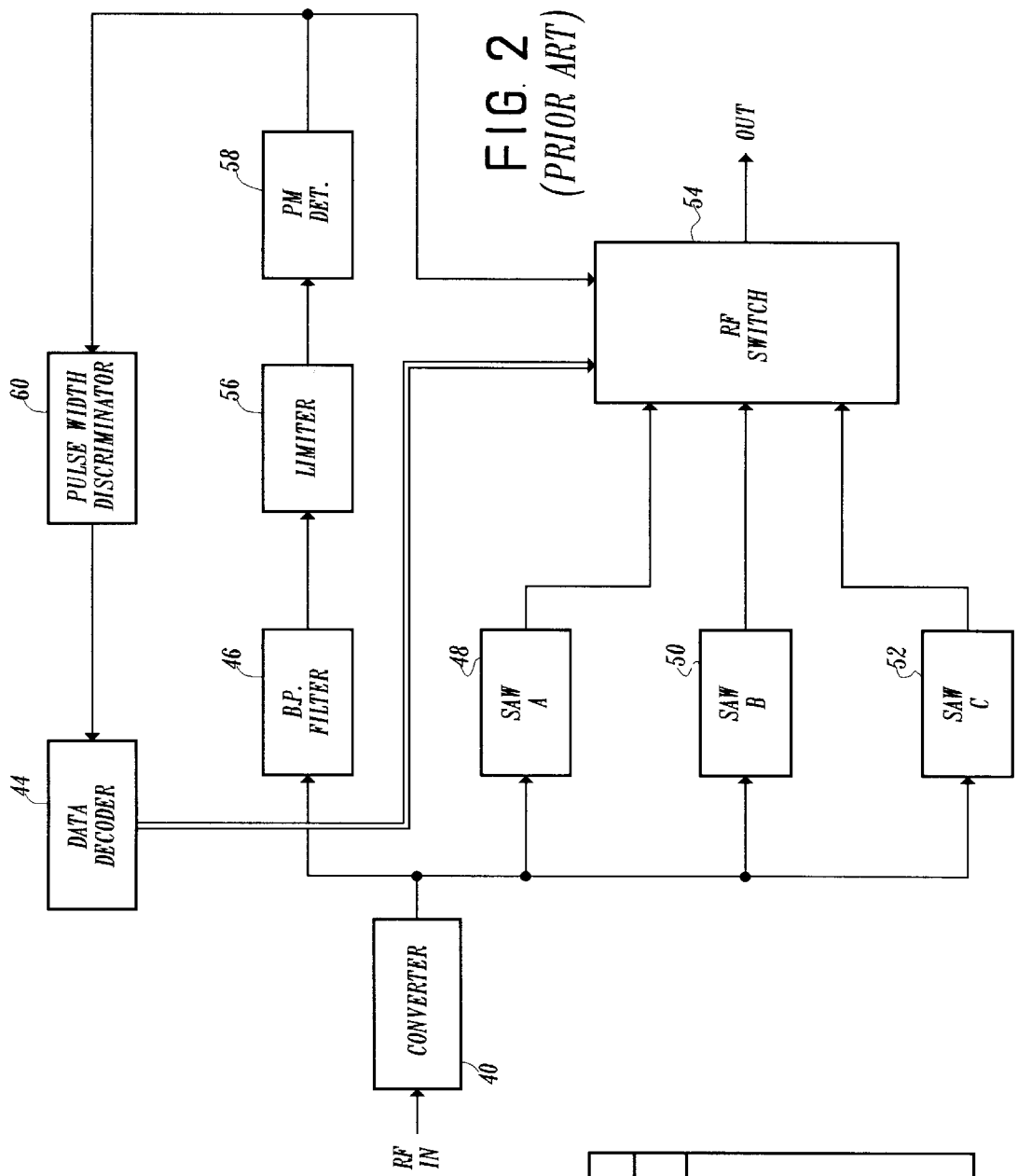

TELEVISION SCRAMBLING SYSTEM

BACKGROUND OF THE INVENTION AND PRIOR ART

This invention relates generally to television signal scrambling systems and particularly to an improved television scrambling system utilizing RF suppression of sync and carrier phase inversion. Such a system is fully described in U.S. Pat. No. 4,706,283, which is incorporated by reference herein, and which is produced by Zenith Electronics Corporation under its trademark "PM".

The PM television scrambling system described in the above patent incorporates three filters that are selectively used, in alternating pairs, to translate the video modulated IF signal. Data is sent in the horizontal intervals of the television signal by the expedient of using two different time intervals to represent the two states of a data bit. The "A" filter imparts substantially no amplitude change or phase reversal to the signal, the "B" filter imparts a 6 dB attenuation and a 180° phase reversal and the "C" filter imparts a 10 dB attenuation and a 180° phase reversal. Selectively switching between the "A" and "B" filters and the "A" and "C" filters, during the horizontal intervals, generates a scrambled signal. Descrambling in the television receiver is accomplished by switching three filters A, B and C into the received signal path that are complementary to their counterpart filters "A", "B" and "C" in the transmitter.

The above-described system has occasionally been compromised by so-called "pirate decoders" Enhancements have been added from time to time to thwart signal piracy and have generally been successful For example, in addition to the mode control signal, a framing code signal is sent in the data for determining which filter pair (A/B or A/C) is to be used in the decoder to recover the scrambled signal. The mode control signal consists of two bits and the framing code signal is either 18 or 24 microseconds in width. In practice, these signals are cycled periodically in an effort to confuse a would-be pirate. Because of the relative slowness of the changes in switching however (due in part to minimize signal artifacts from disturbing the picture recovered by authorized decoders) a determined pirate could still compromise the decoder sufficiently to produce a viewable display. The present invention is directed toward improving the anti-piracy attributes of the PM scrambling system.

The most common method of signal piracy involving the above-described scrambling system incorporates a simple modification of the decoder to cause it to descramble continuously using A/C filter switching. Obviously; when the headend encoder is using A/C switching, a fully descrambled picture is obtained. When the headend encoder is using A/B filter switching; often a watchable picture is obtained, the degree of viewability being determined in part by the particular type of television receiver that is connected to the decoder. Some pirate decoders include a toggle switch for controlling the changeover from A/C switching to A/B switching. As mentioned above, because the elapsed time between switching is relatively long; such a pirate decoder can often be effective. The system enhancement of the invention will result in complete loss of vertical sync in the descrambled signal output of such pirate decoders.

OBJECTS OF THE INVENTION

A principal object of the invention is to provide an RF scrambling system for a television signal.

Another object of the invention is to provide a PM scrambling system; using sync suppression and phase inversion; with improved anti-piracy features.

A feature of the invention resides in causing a loss of vertical sync in non-authorized PM decoders.

BRIEF DESCRIPTION OF THE DRAWINGS

These and other objects and advantages of the invention will be apparent upon reading the following description in conjunction with the drawings; in which:

FIG. 1A illustrates data processor 34' for generating the timing pulses illustrated in FIGS. 5 and 6.

FIG. 2 is a simplified block diagram of a prior art PM decoder used with the invention;

FIG. 3 is a table illustrating filter switching as a function of a mode signal and a framing code signal used in a prior art PM descrambling system;

DESCRIPTION OF THE PREFERRED EMBODIMENT

Figure 1:
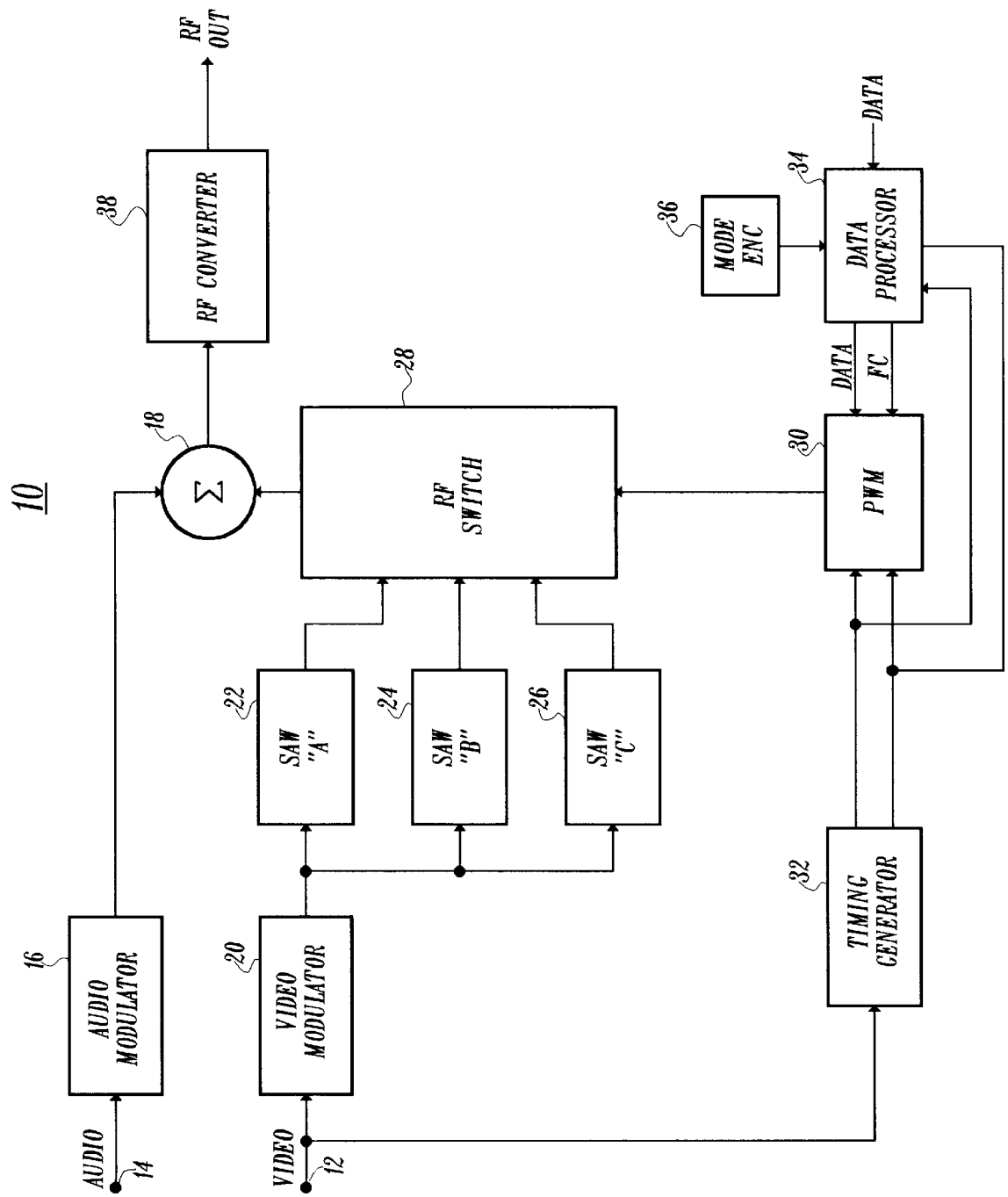
FIG. 1 is a simplified block diagram of a prior art PM encoder used with the invention.

Referring to FIG. 1, a conventional NTSC composite baseband video signal is coupled to an input terminal 12 of a cable plant headend 10, with the associated audio baseband signal being applied to an input terminal 14. The audio baseband signal is coupled to an audio modulator 16 where it is used to frequency modulate an audio intermediate frequency (IF) carrier, typically at a frequency of 41.25 MHz, which is applied to one input of an adder 18. The composite baseband video signal is coupled to a video modulator 20 where it is used to amplitude modulate a video IF carrier, that is spaced 4.5 MHz from the audio IF carrier, ie, at a frequency of 45.75 MHz. The IF video signal developed at the output of modulator 20 is applied to the inputs of three filter devices which, in the preferred embodiment of the invention, comprise surface acoustic wave (SAW) filters 22, 24 and 26. The outputs of SAW filters 22, 24 and 26 are selectively coupled by an RF switch 28 to a second input of adder 18.

RF switch 28 is operated in response to a pulse width modulator (PWM) 30 which provides a horizontal rate output defining the width of each encoding interval The system operates with two different width encoding intervals T1 and T2 representing the complementary states of a respective data bit. Thus the relatively wide encoding interval T2 may represent a logic "1" data bit and the narrower encoding interval T1 may represent a logic "0" data bit. PWM 30, in response to vertical and horizontal rate timing signals supplied by a timing generator 32, couples a horizontal rate pulse width modulated signal defining the wide and narrow encoding intervals T2 and T1 to RF switch 28 in accordance with data supplied by data processor 34. A mode encoder 36 supplies a two bit mode signal to data processor 34. Data processor 34 supplies data information and framing code information to PWM 30, all in a manner well known in the art. An RF converter 38 is supplied with the output of adder 18 and develops an RF output signal on either channel 3 or 4 for viewing on a conventional television receiver (not shown)

RF switch 28 is effective for coupling only the output of "A" filter 22 to adder 18 at all times except during an encoding interval T1 or T2 as defined by the output of PWM 30. During these time intervals, RF switch 28 couples the output of either the "B" filter 24 or the "C" filter 26 to adder 18. The particular one of the filters coupled is determined by the mode signal and the framing code signal, as will be explained. The characteristics selected for the SAW filters are as follows: "A" filter 22 imposes substantially zero attenuation and no phase shift on the signal; "B" filter 24 imparts a 6 dB attenuation and a 180° phase reversal; and "C" filter 26 imparts a 10 dB attenuation and a 180° phase reversal The result is that a scrambled video signal and a distorted audio signal are received by a viewer without an authorized decoder, ie, one that is capable of following the encoder filter switching and performing complementary filter switching in the decoder.

In FIG. 2, the signal is received from the transmitter by a converter 40 which supplies a bandpass filter 46 and SAW filters A, B and C that are complementary to SAW filters "A", "B" and "C", respectively, in the encoder. These filters are identified by reference characters 48, 50 and 52, respectively. The bandpass filter 46 supplies a limiter 56 that, in turn, supplies the limited signal to a phase modulation (PM) detector 58. The output of PM detector 58 is coupled to an RF switch 54 and to a pulse width discriminator 60. PM detector 58 determines the intervals T1 and T2 which are used to control the operation of RF switch 54. The intervals T1 and T2 are identified by pulse width discriminator 60 and this information is supplied to a data decoder 44, which is coupled to an RF switch 54. Data decoder 44 thus determines the mode information, i.e. the mode signal bits and the framing code and generates a filter select signal for determining the filter switching, i.e., whether filters A and B will be alternately switched or filters A and C. The filter select signal is coupled to RF switch 54 over a data link 45 from data detector 44.

The combinations of the filters that are switched is given in the table of FIG. 3 which lists the mode bits, the framing codes and the resultant ones of filters A, B and C that are switched. As mentioned, the mode bits and framing code are changed on a periodic basis to enhance the signal scrambling. These changes generally occur during scene changes or rapid video movement to minimize adverse effects upon the reproduced picture. It will be noted that for mode states 00 and 11, changes in the framing code do not result in a change in filters being switched.

Figure 4:
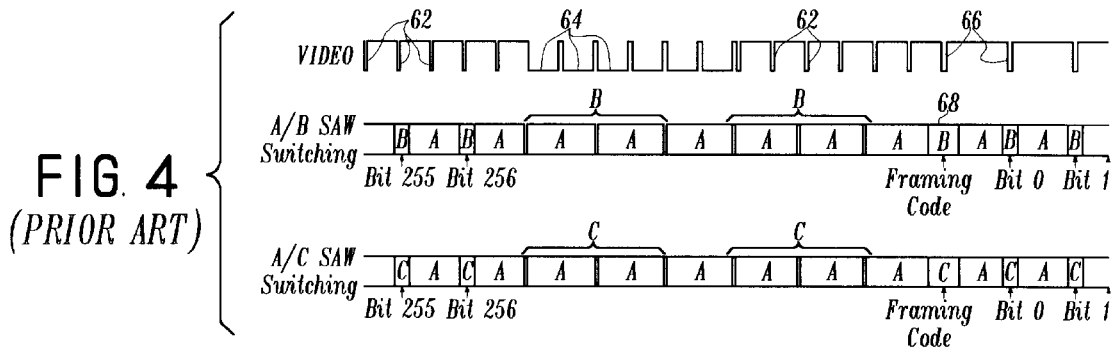
FIG. 4 illustrates the operation of the prior art PM filter switching system.

The diagrams of FIG. 4 illustrate operation of the prior art scrambling system for a portion of the video signal, specifically, the portion commencing with the vertical interval and extending into normal video. A series of twice horizontal frequency equalizing pulses 62 precede a group of vertical broad pulses 64, which are followed by another series of equalizing pulses 62 and normal rate horizontal pulses 66. The A/B SAW switching diagram denotes when each of the filters A and B is active. During the occurrence of the vertical broad pulses 64, the signal is passing through filter A, which it will be recalled, imparts substantially no attenuation or phase change. As is seen with regard to A/C SAW filter switching, the same situation obtains, with the vertical broad pulses experiencing no attenuation or phase change. The position of the framing code signal 68 is illustrated on the switching diagrams as are the data bits (0–256) conveyed via the time periods T1 and T2 during the horizontal intervals. In FIG. 4, a 24 microseconds framing code signal is shown for both A/B and A/C filter switching. It will be appreciated that the framing code signal could also be 18 microseconds in width, with the resulting filter switching being given in FIG. 3.

Figure 5:
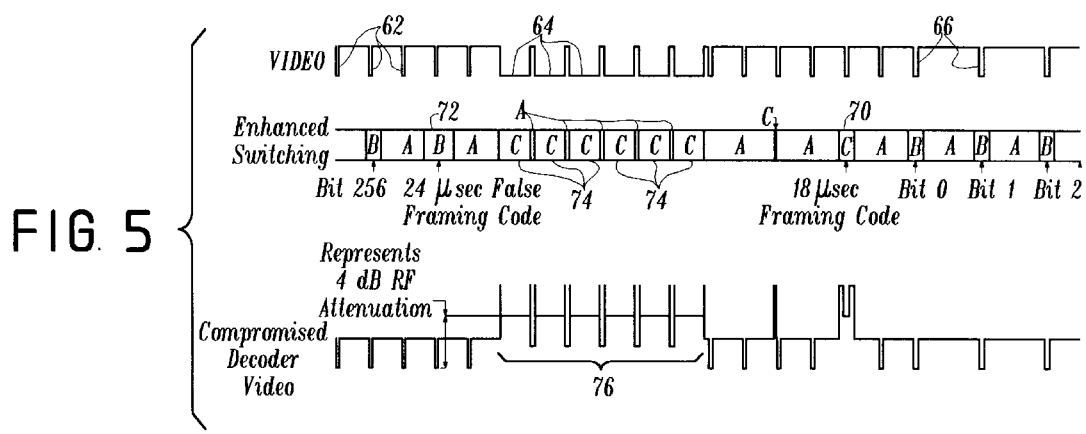
FIG. 5 illustrates the operation of a PM filter switching system in accordance with one aspect of the invention.

FIG. 5 depicts one aspect of the invention in which a false framing code signal 72 is inserted just prior to the vertical broad pulses to switch the decoder filters from A/B to A/C. Data processor 34' (FIG. 1A) generates the framing code signals of FIGS. 5 and 6 of the invention. The 24 microseconds false framing code signal 72 is followed by a series of 27 microseconds false framing code signals 74. The false framing code signals 74 are wider than the vertical broad pulses and result in a net 4 dB attenuation of the vertical broad pulse in a pirate or compromised decoder, which is unable to follow the filter switching. The true framing code signal 70 is 18 microseconds wide and causes a reversion to A/B filter switching An authorized decoder recognizes the 27 microseconds false framing code signals 74 as legitimate and switches in synchronism with the encoder switching Thus the vertical broad pulses in the signal of an authorized decoder do not experience any distortion. As seen by the area 76 of the compromised decoder video output, there is an uncompensatable 4 dB attenuation of the vertical syncs with respect to the restored horizontal syncs. The result is an unviewable picture. Note that this aspect of the invention can only be effectively implemented when the mode bits in the program are 10 (A/B to A/C switching).

Figure 6:
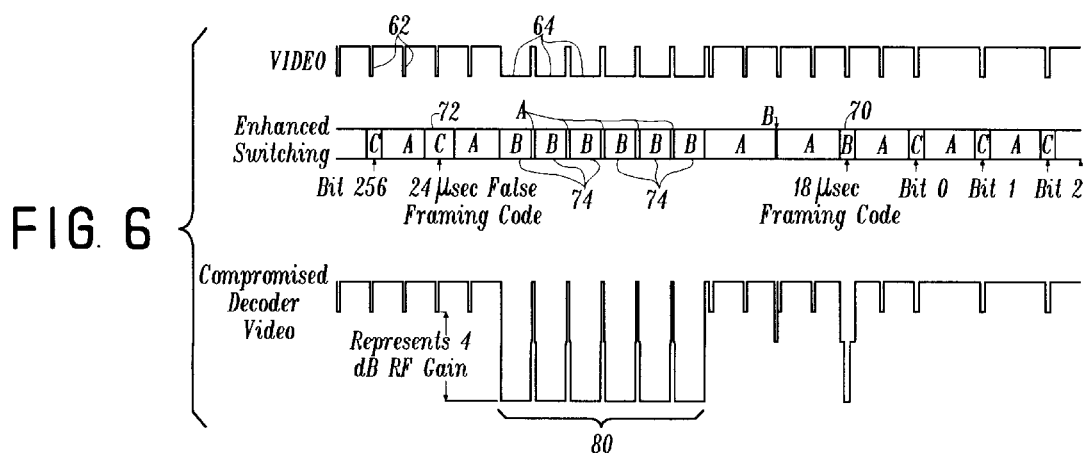
FIG. 6 illustrates the operation of a PM filter switching system in accordance with another aspect of the invention.

FIG. 6 illustrates the aspect of the invention that involves A/C to A/B switching, ie., when the mode bits are 01. The compromised decoder video output is seen, in area 80, to contain vertical syncs that experience a 4 dB gain and consequently extend far below the restored horizontal sync levels. Again, authorized decoders are capable of recognizing the false framing codes as legitimate framing codes and switching the filters accordingly.

What has been described is an enhanced scrambling system for a sync suppression, phase inversion scrambling system It is recognized that numerous changes to the described embodiments of the invention will be apparent to those skilled in the art without departing from its true spirit and scope. The invention is to be limited only as defined in the claims.

What is claimed is:

1. A method of scrambling a television signal comprising: switching the television signal, during horizontal intervals therein, to pass the television signal, on an alternating basis, through filters A and B responsive to the combination of a first framing code signal and a mode signal:

switching the television signal, during horizontal intervals therein, to pass the television signal, on an alternating basis through filters A and C, responsive to the combination of a second framing code signal and the mode signal; and switching between the set of filters A and B and the set of filters A and C during a vertical interval of the television signal in response to a third, false framing code signal.

2. The method of claim 1 wherein vertical broad pulses are present in the vertical interval and wherein the third framing code signal has a duration in excess of that of a vertical broad pulse.

3. The method of claim 2 wherein filter A imparts substantially no attenuation or phase shift to the television signal, filter B imparts 6 dB of attenuation and a phase reversal and filter C imparts 10 dB of attenuation and a phase reversal.

\* \* \* \* \*